United States Patent [19]

Justice

[11] 3,710,014

[45] Jan. 9, 1973

[54] COLOR TELEVISION SYSTEM

[75] Inventor: James W. H. Justice, Murrysville, Pa.

[73] Assignee: Westinghouse Electric Corporation, Pittsburgh, Pa.

[22] Filed: Dec. 30, 1970

[21] Appl. No.: 102,619

[52] U.S. Cl. ..........................178/5.4 ST, 178/5.4 CF

[51] Int. Cl. ..................................................H01n 9/06

[58] Field of Search .....................178/5.4, 5.2, 5.4 ST

[56] References Cited

UNITED STATES PATENTS 2,703,340 3/1955 Hoyt................................178/5.4 CF 3,584,140 6/1971 Kubota............................178/5.4 ST

*Primary Examiner*—Robert L. Griffin

*Assistant Examiner*—John C. Martin

*Attorney*—F. H. Henson, C. F. Renz and A. S. Oddi

[57] ABSTRACT

A color television system employing a single tube television camera wherein a filter wheel permits the transmission of luminance information to the camera during a first field and bicolor information, consisting of two primary colors, during a second field, with the video information corresponding to the luminance and bicolor information being transmitted for processing into video information corresponding to the three primary colors.

9 Claims, 6 Drawing Figures

COLOR TELEVISION SYSTEM

BACKGROUND OF THE INVENTION

1. Field of the Invention

The present invention relates to color television systems and, more particularly, to color television systems employing a single tube television camera.

2. Discussion of the Prior Art

For the production of color television signals in the standard NTSC format three separate camera tubes are most commonly employed with each camera being responsive to one of the primary colors. It is also possible to utilize only two tubes for sensing two primary colors with the third primary color being produced by the proper combination of the two sensed primary colors. It is a requirement in both the two and three color tube systems that each of the tubes be properly registered with one another to insure proper color and luminance video signal production and reproduction. A color television system employing a single tube with a color filter wheel has the advantage of being lighter and smaller than the previously described system. This would be highly advantageous where weight and space are at a premium such as in space vehicle applications or where the camera must be highly portable. The single tube filter wheel system moreover eliminates the registraction problem as well as not requiring the use of a color subcarrier for the modulation of the color information.

The single tube filter wheel system employs generally a field sequential type of format wherein the filter wheel is typically divided into three sectors corresponding to the three primary colors. During three successive fields the respective primary colors are transmitted to the camera via the corresponding sectors of the filter wheel. The video signals produced in response to each of the primary colors is then processed with total color and luminance information being available after three fields. It would be highly desirable if all the color and luminance information could be obtained in a lesser number of fields than three. This would permit improved performance for live action reproduction since a three field system requires three complete fields before a change in position could be sensed. If for example complete color and luminance information were available in two fields there would accordingly be less smearing of the picture upon reproduction as compared to a three field system. Another highly desirable feature would be the direct availability of the luminance signal rather than producing the luminance signal by the combination of the three primary color signals. The direct availability of luminance signals would provide monocrome video signals having a high signal to noise ratio as compared to those produced by the combination of the primary color signals. The direct availability of the luminance signals would have particular desirability in the case of very long distance transmissions such as from a space vehicle.

SUMMARY OF THE INVENTION

Broadly, the present invention provides a color television system wherein only a single tube camera is employed and complete color and luminance information is provided every two fields of scan so that a highly portable system is provided and high quality signals are supplied at a remote location for reproduction.

DESCRIPTION OF THE PREFERRED EMBODIMENT

Figure 1:
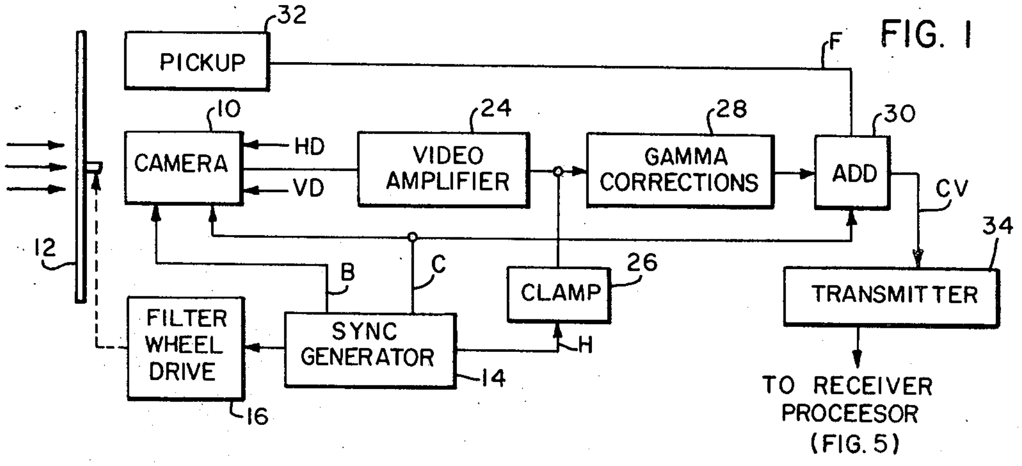
FIG. 1 is a block diagram of the color television system of the present invention.

Referring to FIG. 1, the transmitter portion of the present color television is shown which ideally would be located at a remote location such as a space vehicle or other location where small size, low weight and high portability are demanded. The transmitter employs a single tube television camera 10 which has a filter wheel 12 disposed between it and a color image to be converted by the camera and into video signal information. A sync generator 14 provides a vertical output V at the vertical (field) scanning rate to a filter wheel drive 16 which causes the filter wheel 12 to be rotated at a speed so that one complete revolution of the wheel is completed in the time corresponding to two fields or one complete frame. Hence, if a vertical field rate of one-sixtieth of a second, meaning the rotational speed for the filter wheel 12 of 1,800 revolutions per minute.

Figure 2:
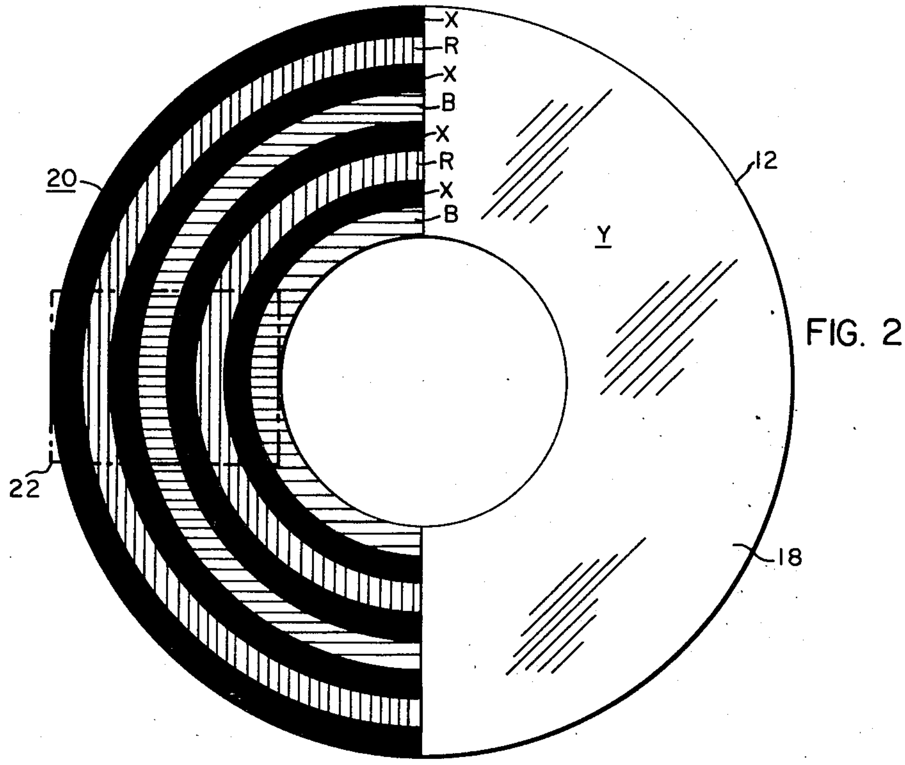
FIG. 2 is a diagram of the filter wheel as employed in FIG. 1.

FIG. 2 shows the filter arrangement for the filter wheel 12 which is shown to be divided into semicircular sectors. One semicircular sector consists of luminance portion 18 which is responsive to transmit all colors substantially equally well. The other semicircular sector comprises a bicolor filter portion 20. The portion 20 includes a plurality of red semicircular strips R which are primarily responsive to the primary color red while substantially excluding all others, a plurality of blue semicircular strips B which are primarily responsive to the primary color blue while substantially excluding all others and a plurality of opaque strips X which block the transmission of light therethrough. The sequential arrangement of the semicircular strips from the circumference of the wheel toward the center would thus be: X – R – X – B . . . as shown in FIG. 2. Only two semicircular strips are shown for the red and blue strips, respectively but it should be understood that the showing in FIG. 2 has been made only for purposes of simplicity in explanation and that a larger number of color filter strips could be employed. The number of strips would be determined by the bandwidth required for the color information with the maximum color bandwidth being limited by the accuracy with which the color passing through the filter strips could be imaged onto the target of the camera 10. The dotted block 22 in FIG. 2 outlines the target area of the camera 10.

The sync generator 14 supplies blanking signals B and composite synchronizing signals C to the camera 10. In response to horizontal drive signals and vertical drive signals, which may be supplied as part of the camera unit as is common practice, the camera 10 scans its target at a horizontal line rate H and a vertical field rate V. A luminance video output from the camera 10 corresponding to the luminance input thereto is provided during a first field of scan and bicolor video output is supplied during the second field of scan in response to the bicolor thereto. The video output of the camera 10 is applied for amplification to a video amplifier 24.

The sync generator 14 supplies a horizontal rate output H to a clamping circuit 26 which has its output connected to the output A + B of the video amplifier 24. The function of the clamp 26 is to clamp the output of the video amplifier A + B to a black reference level at the end of each horizontal line of scan.

Figure 3A:
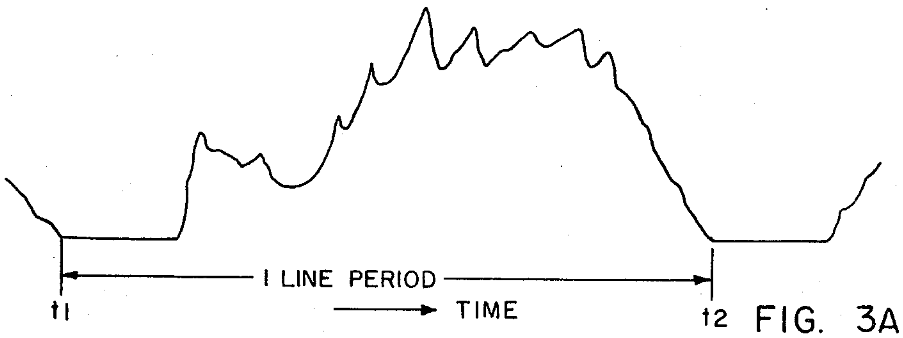
FIGS. 3A and 3B are waveform diagrams used in the explanation operation of the system of FIG. 1.
Figure 3B:
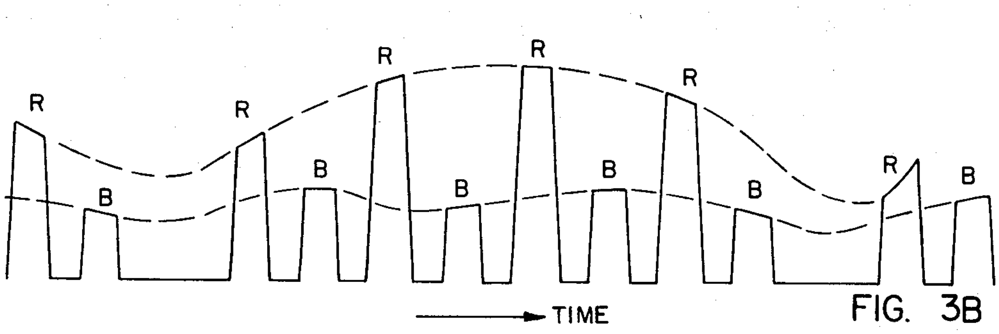

Curves A and B of FIG. 3 respectively show the output of the video amplifier 24 during one line taken during a given luminance field (curve A) and one line during a given bicolor field (curve B). As shown in curve A of FIG. 3 during the luminance field, the video amplifier outputs a video signal corresponding to the light information transferred through the luminance portion 18 of the filter wheel 12. One line period extends from the time t2 when a signal H is applied to the clamp 26 causing the output of the video amplifier 24 to be clamped to the black level as indicated. Thus at the beginning of each line of scan the signal will be clamped to the black level.

Curve B of FIG. 3 shows the output of the video amplifier 24 during the bicolor field of scan. Alternate video pulse signals R and B are indicated corresponding to the red and blue portions of the image scan during that horizontal line. The video signals shown in curve B of FIG. 3 would correspond to a filter wheel having four semicircular strips responsive to red color information and four semicircular strips responsive to blue color information. Between adjacent red and blue video pulses, the video signal would be at a black level corresponding to the opaque strips X as shown in FIG. 2. At the beginning of each horizontal line the clamp circuit 26 would cause the output of the video amplifier 24 to be clamped to the black level upon receiving the input signal H from the sync generator 14.

The clamping of the video output A + B of the video amplifier 24 to the black level at the beginning of each horizontal line establishes a reference level for application of the video signals A + B to a down-gamma correction circuit 28. The function of the down-gamma correction circuit 28 is to precondition the video signal supplied thereto prior to transmission as is well known in the television art. Hereinafter the prime (1) designation will be employed to designate signals that have received down-gamma processing.

The output of the gamma-correction circuit 28 is applied to an adder 30. Also applied to the adder 30 is the composite sync output C from the sync generator 14 and a frame reference pulse F provided by a pickup 32 in response to each complete revolution of the filter wheel 12. The pickup 32 may comprise an electromechanical, light sensitive or magnetic pickup which provides a pulse output signal each time a selected radius of the filter wheel rotates through a given position.

Figure 4:
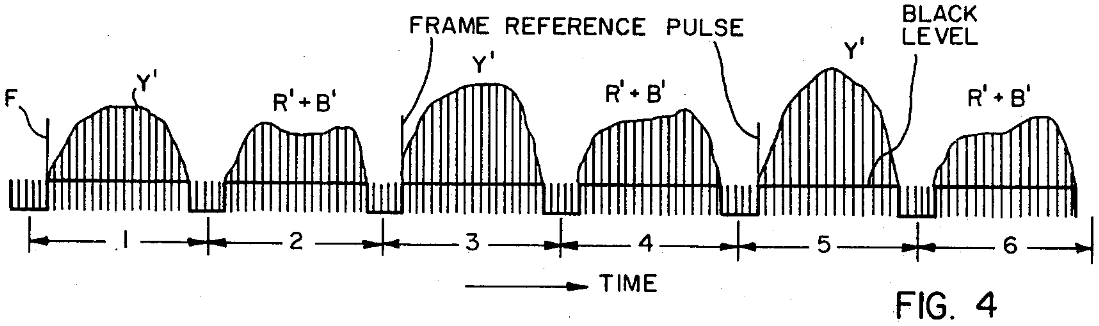
FIG. 4 is a waveform diagram showing the composite video output of the system of FIG. 1.

The output of the adder 30 is thus a composite video output CV including video information corresponding to the luminance A and bicolor B video signal composite synchronizing signals and the frame reference pulses F. FIG. 4 shows the composite video signal CV for three frames or six field periods. Each frame is shown to begin with a frame reference pulse F which is then followed by the down-gamma corrected luminance portion Y' during the first field followed by the down-gamma corrected R' + B' bicolor portion during the second field. The composite synchronizing information and the black level are also designated in the figure.

Figure 5:
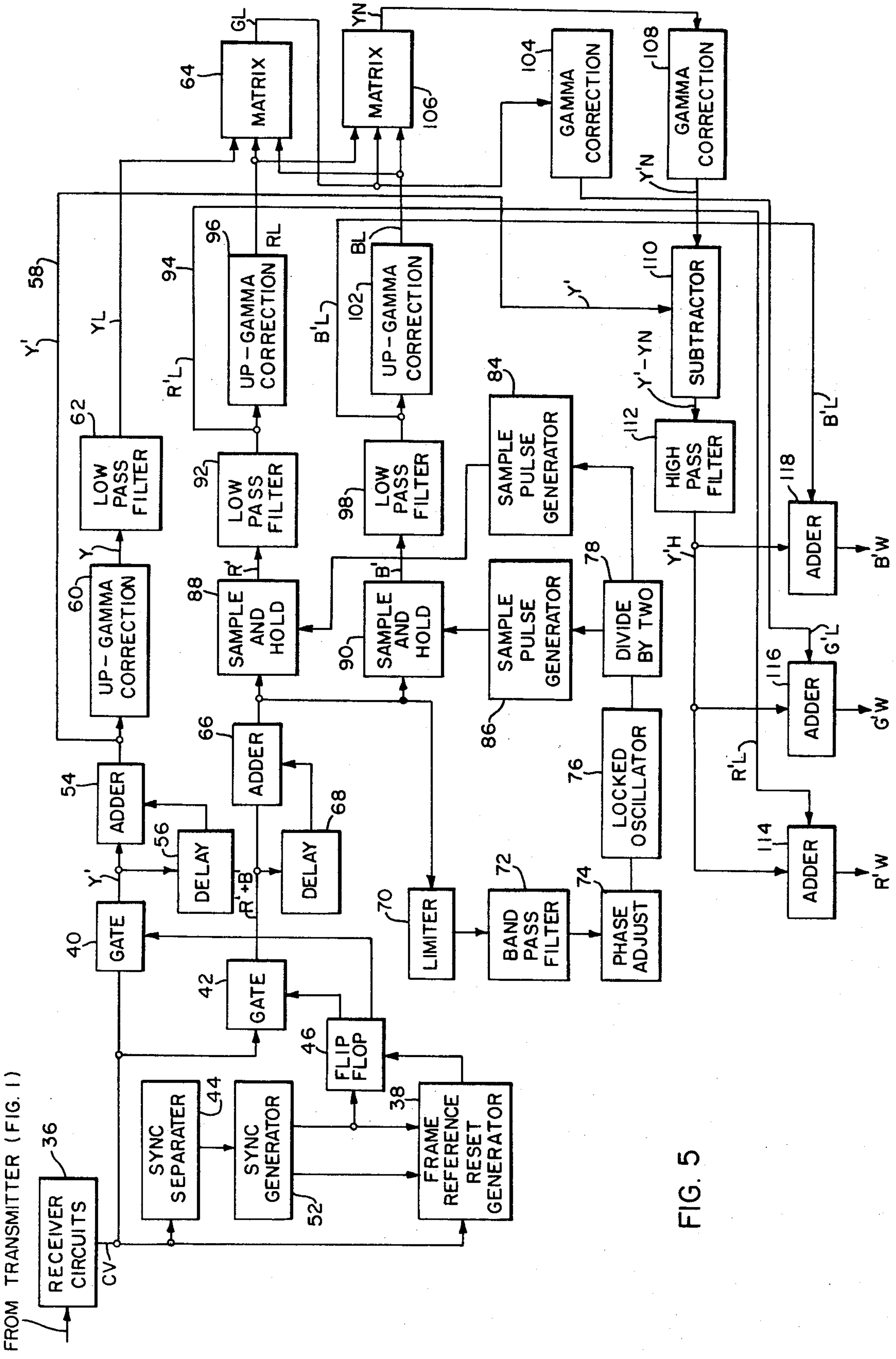
FIG. 5 is a block diagram of the receiver processor portion of the present invention.

The composite video output CV is applied to a transmitter 34 wherein the composite video signal CV is processed (for example used to modulate a carrier frequency) for transmission to a receiver processor such as shown in FIG. 5. The apparatus as shown in FIG. 1 could be located at distance point, such as, a space vehicle or other remote point, and would provide the necessary luminance and color information for the eventual reproduction of the image in color or black and white.

The transmitted composite video information from the transmitter 34 is applied to a receiver circuit 36 for demodulation therein so that the output of the receiver 36 corresponds substantially to the composite video signal CV (FIG. 4) as applied to the input of the transmitter 34. The composite video signal CV is applied to a frame reference reset generator 38, a gate 40, a gate 42 and a sync separator 44. The frame reference reset generator 38 is responsive to the frame reference pulses F in the composite waveform CV to provide a reset output for application to a flip-flop 46. This causes the flip-flop 46 to be reset to a gating output at its output 48 and no gating output at its output 50. The gating output at 48 causes the gate 40 to translate the portion of the composite video signal appearing at the input thereof at that time, which will be the luminance portion Y' since a frame reference pulse F immediately precedes the luminance portion Y'.

The sync separator 44 is operative to separate the synchronizing information from the composite video signal CV. The sync information from the output of the sync separator 44 is applied to a sync generator 52 which supplies the vertical output V at the field rate and the horizontal output H at the horizontal ray. The outputs V and H are are applied to the frame reference reset generator 38. The vertical signal V is applied to the flip-flop 46 which in response thereto is operative to change the output state thereof so that a gating signal appears at the output 50 and no gating signal at the output 48. This thereby causes the gate 40 to be blocking and the gate 42 to be in a translating state so that the then existing video input to the gate 42 is translated thereto which will be the bicolor video signals R' + B' during the second field. When the next vertical synchronizing pulse is received at the end of the second field, the sync generator 52 will provide another vertical output pulse to the flip-flop 46 causing the flip-flop 46 to revert to its other output state with the output 48 having a gating signal and the output 50 having no gating signal to render the gate 40 translating and the gate 42 blocking. This gating process will continue with the luminance output Y' appearing at the output of the gate 40 and the bicolor video output R' + B' appearing at the output of the gate 42 turning successive fields. The inclusion of the frame reference pulses F in the composite video signal CV insures that the flip-flop 46 is reset at the beginning of the field including the luminance video signals Y'. Thus the gates 40 and 42 are gated in the proper sequence to translate the luminance Y' and the bicolor video signals R' + B' in the proper sequence.

The luminance signal Y' is applied directly to an adder 54 and also to a delay circuit 56 for delaying the signal Y' by approximately one field before application to the adder 54. The delay circuit may for example comprise a magnetic disc recorder whereon the video signal Y' would be recorded and then played back with a one field delay time. The output of adder 54 is thus the directly applied signal Y' plus the signal Y' delayed by one field. In other words the output of the adder 54 will constitute one complete frame of the luminance signal Y' with the first field being repeated as the second field of the frame. The output of the adder 54 is thus the down-gamma corrected luminance signal Y' which is repeated during the second field of each frame. The signal Y' from the adder 54 is provided on an output 58 of the adder 54 for later utilization as will be explained below The output of the adder 54 is also applied to an up-gamma correction circuit 60 which is operative to return the luminance signal to its original state (Y) prior to down-gamma correction at the transmitter of FIG. 1. The output of the up-gamma correction circuit 60 is thus the luminance output Y. The output Y is applied to a low pass filter 62 for bandwidth limiting the luminance signal Y so that a low frequency luminance signal YL is provided at the output thereof which is applied to a first input of a matrix circuit 64.

During the second field of each of the transmitted frames of the composite video signal CV, the bicolor video signals R' + B' are translated by the gate 42 directly to an adder 66. The video signal R' + B' is also applied to a delay 68 which delays this signal by approximately one field in an identical fashion as discussed above with respect to the delay 56. The adder 66 thus receives the direct bicolor video signal R' + B' and the bicolor video signals delayed by one field so that the output thereof is a frame of bicolor video information with the second field being repeated. The video frame of R' + B' information from the output of the adder 66 is applied to a limiter 70. The function of the limiter 70 is to limit the R' + B' output to a predermined amplitude so the output thereof is a series of equal amplitude pulses corresponding in timing to the pulses R and B as shown in curve B of FIG. 3 for example. The limited output of the limiter 70 is applied to a band pass filter 72 whose pass band is selected so that the output thereof in response to the pulse input thereto from the limiter 70 is an alternating signal corresponding to the pulse repetition rate of the red and green pulse input thereto.

The output of the band pass filter 72 is applied to a phase adjust circuit 74 wherein the timing at which the zero crossing of alternating signal from the band pass filter 72 is adjusted as desired to select properly the half cycles of the alternating waveform corresponding to the respective red and blue information in the output of the band pass filter 72. The output of the phase adjust circuit 74 is applied to a locked oscillator 76 which provides an output locked in phase and frequency with the input thereto. The output of the locked oscillator 76 is applied by a divide-by-two circuit 78, which is operative to divide the frequency of the input thereto by one-half and supply at a first output 80 thereof the odd cycles of the input thereto, that is, 1, 3, 5 . . . and the even cycles 2, 4, 6 . . . at the other output 82 thereof. The output 80 of the divide-by-two circuit 78 is applied to a sample pulse generator 84 which in response thereto provides a red sampling pulse SR. The output 82 of the divide-by-two circuit 78 is supplied to a sample pulse generator 86 which in response thereto supplies a blue sample pulse SB. As previously explained the red and blue color information is alternately scanned such as shown in curve B of FIG. 3 with the red information appearing first in each line of scan. Thus the output 80 from the divide-by-two circuit 78 corresponds in time to the occurrence of red information and output 82 corresponds in time to the occurrence of blue information. The respective red sampling pulses SR and blue sampling pulses SB accordingly are provided at times when red and blue information respectively occur in the bicolor video output of the adder 66.

The bicolor output of the adder 66 is applied to both a red sample and hold circuit 88 and a blue sample and hold circuit 90. The red sampling pulses SR from the sample pulse generator 84 are applied to the sample and hold circuit 88 so that the bicolor output of the adder 66 is sampled at a time when the red video signal R' is present so that the circuit 88 provides an R' output when the red sample pulses SR are applied thereto. The blue sample pulses SB are applied to the sample and hold circuit 90 at a time when the blue video signal B' is present so that the output thereof will be a blue video signal B'. This sampling process will continue for each of the fields of the bicolor video signals R' + B' such that the respective signals R' and B' are extracted from the bicolor video signals R' + B' by the sampling operation as just explained.

The red video signals R' from the sample and hold circuit 88 are applied to a low pass filter 92 to limit the bandwidth thereof to the low frequency range with the low frequency red video signals R'L appearing at an output 94 thereof. The output of the low pass filter 92 is also applied to an up-gamma correction circuit 96 for converting the down-gamma corrected red video signal R'L to the low frequency red video signal RL without gamma correction which is applied as a second input to the matrix 64.

The blue video signals B' from the sample and hold circuit 90 are applied to a low pass filter 98 for band pass limiting to the lower frequency range with an output 100 supplying the bandwidth limited blue video signals B'L. The output of the low pass filter 98 is also applied to an up-gamma correction circuit 102 for processing the previously down-gamma corrected signal B'L to the low freqnecy blue video signal BL which is applied as the third input to the matrix 64.

The function of the matrix 64 is to combine the bandwidth limited luminance signals Y, red signals RL and blue signals RL in the proper combination to provide the green primary color video signal GL which will also be bandwidth limited. Such matrixing operations performed in the matrix 64 are well known in the color television art. The low frequency green video output GL is applied to a down-gamma correction circuit 104 for the processing to the down-gamma corrected green video signal G'.

The available color information is thus the low frequency video signals RL, Bl and GL. Also available is the down-gamma corrected luminance signal Y' from the adder 54 which has not been bandwidth limited. Thus through the use of a mixed high principle suitable wide band color video signals R'W, B'W and G'W can be obtained which have a high bandwidth including both low and high frequency components of the video information.

The low frequency primary color signals Rl, GL and BL are applied to a matrix network 106 to be combined by well known techniques to provide a bandwidth limited luminance signal YN at the output thereof. This low frequency luminance signal YN is applied to a down-gamma correction circuit 108 to supply a down-gamma corrected luminance signal Y'applied which is low frequency. The signal Y'N is APPLIED to a substractor 110 where it is combined with the down-gamma corrected wide bandwidth luminance signal Y'. The output of the subtractor 110 is then Y' – Y'N with the low frequency components of the luminance signal Y' having been cancelled so that the signal Y' – Y'N includes only high frequency components. This signal is applied to a high pass filter 112 to eliminate any low frequency noise appearing in the signal Y' – Y'N. The output of the high pass filter 112 is thus a signal YH which includes only high frequency components of the luminance signal.

The high frequency luminance signal YH is applied to each of three adder circuit 114, 116 and 118. In the adder 114 the signal YH is applied to the low frequency red signal R'L to provide the wide band red video signal R'W. The low frequency video signals G'L and B'L are respectively added to the signal YH in the adder circuits 116 and 118 to supply respectively the wide band green signal G'W and the wide band blue video signal B'W.

The mixed high color signals R'W, G'W and B'W may thus be utilized for reproducing a color image corresponding to the originally scanned video image at the transmitting source. Also the luminance signal Y' may be employed to reproduce a monochrome image corresponding to the originally scanned image. The color information R'W, G'W and B'W and the luminance information Y' may also be employed as input information to be retransmitted according to the standard NTSC system for general television viewing purposes. If color retransmission is desired, the color information R'W, G'W and B'W may be employed to modulate a color subcarrier as is well known in the NTSC system with the luminance information being supplied by the transmission of the signal Y' modulating the main carrier. If only a monochrome retransmission is desired, the color information would not be transmitted and the luminance signal Y' being employed to modulate the transmission carrier.

I claim as my invention:

1. In a color television system the combination of:
camera means for scanning a color image;
filter means disposed between said camera means and said color image including
a luminance portion for translating all of said color image to said camera means during a first field of scan thereof, and
a color filter portion for translating respectively first and second primary colors of said color image in each line of scan to said camera means during a second field of scan,
said camera means providing luminance video signals during said first field and bicolor video signals during said second field;
means for providing frame reference pulses defining the beginning of each frame of scan;
sync generating means for providing synchronizing information for controlling the synchronization of said camera means and said filter means; and
means for combining said luminance video signals, said bicolor video signals, synchronizing information from said sync generating means and said frame reference pulses to provide a composite video output.

2. The combination of claim 1 includes:
clamping means for clamping said luminance and bicolor video signals to a reference level at the beginning of each line of scan; and
means for down-gamma processing said luminance and bicolor video signals prior to application to said means for combining.

3. The combination of claim 1 wherein:
said color filter portion of said filter means includes
a first plurality of color filters responsive to one of said primary colors and
a second plurality of color filters responsive to the other of said primary colors,
said first and second portions are alternately disposed so that said two primary colors are alternately scanned in each line by said camera means.

4. The combination of claim 3 wherein:
said filter means comprises a filter wheel wherein said luminance portion comprises one semicircular sector of said wheel and said color filter portion comprises the other semicircular sector wherein said first and second pluralities comprise semicircular strips,
said color filter portion further includes opaque semicircular strips disposed between adjacent strips of said first and second pluralities to block said color image from said camera means.

5. The combination of claim 1 includes:
means for transmitting said composite video signals;
receiver means for receiving said transmitted composite video signals and recovering said composite video signals;
gating means responsive to said frame reference signals and said synchronizing information in said composite video signals for translating said luminance video signals during said first frame and said bicolor video signals during said second frame;
first processing means for processing said luminance video signals;
means for extracting from said processed bicolor video signals first and second primary color video signals corresponding to said first and second primary colors; and
means for receiving said processed luminance signals and said first and second primary color video signals and providing in response thereto third primary color video signals corresponding to the third primary color.

6. The combination of claim 5 wherein:

said first processing means includes delay means for delaying said luminance signals for approximately one field and adding means for adding said luminance signals which are not delayed to said delayed luminance signals to provide said processed luminance signals; and said second processing means includes delay means for delaying said bicolor signals for approximately one field and adding means for adding said bicolor signals which are not delayed to said delayed bicolor signals to provide said processed bicolor signals.

7. The combination of claim 6 wherein:

said means for extracting includes first and second sampling means for receiving said processed bicolor signals, and pulse generating means responsive to said processed bicolor signals for generating first and second sampling pulses for application to said first and second sampling means respectively so that said first and second primary color video signals are respectively provided from said first and second sampling means.

8. The combination of claim 5 includes:

clamping means for clamping said luminance and bicolor video signals to a reference level at the beginning of each line of scan;

means for down-gamma processing said luminance and bicolor video signals prior to application to said means for combining so that said transmitted luminance and bicolor video signals are down-gamma processed;

said first processing means includes means for up-gamma processing said luminance signals that had previously been down-gamma processed to provide said luminance video signals, said means for extracting includes means for up-gamma processing said first and second primary color video signals extracted from said bicolor signals that had previously been down-gamma processed to provide said first and second primary color video signals.

9. The combination of claim 8 includes:

means for bandwidth limiting said luminance signals provided by said means for up-gamma processing to provide bandwidth limited luminance signals;

means for bandwidth limiting said down-gamma processed first primary color video signals so as to provide bandwidth limited down-gamma process first primary color video signals and bandwidth limited first primary color signals;

means for bandwidth limiting said down-gamma processed second primary color video signals so as to provide bandwidth limited down-gamma processed second primary color video signals and bandwidth limited second primary color video signals;

said means for receiving responsive to said bandwidth limited luminance video signals and said bandwidth limited first and second primary color video signals to provide bandwidth limited third primary color video signals;

means for down-gamma processing said bandwidth limited third primary color video signals;

means for providing low frequency luminance video signals in response to said bandwidth limited first, second and third primary color video signals;

means for down-gamma processing said low frequency luminance video signals;

means for substracting said down-gamma processed low frequency luminance video signals from said down-gamma processed luminance video signals to provide down-gamma processed high frequency luminance video signals; and means for combining said down-gamma processed high frequency luminance video signals respectively with said bandwidth limited down-gamma processed first, second and third primary color video signals to provide wide bandwidth down-gamma processed first, second and third primary color video signals respectively.

* * * * *